Patented May 22, 1934

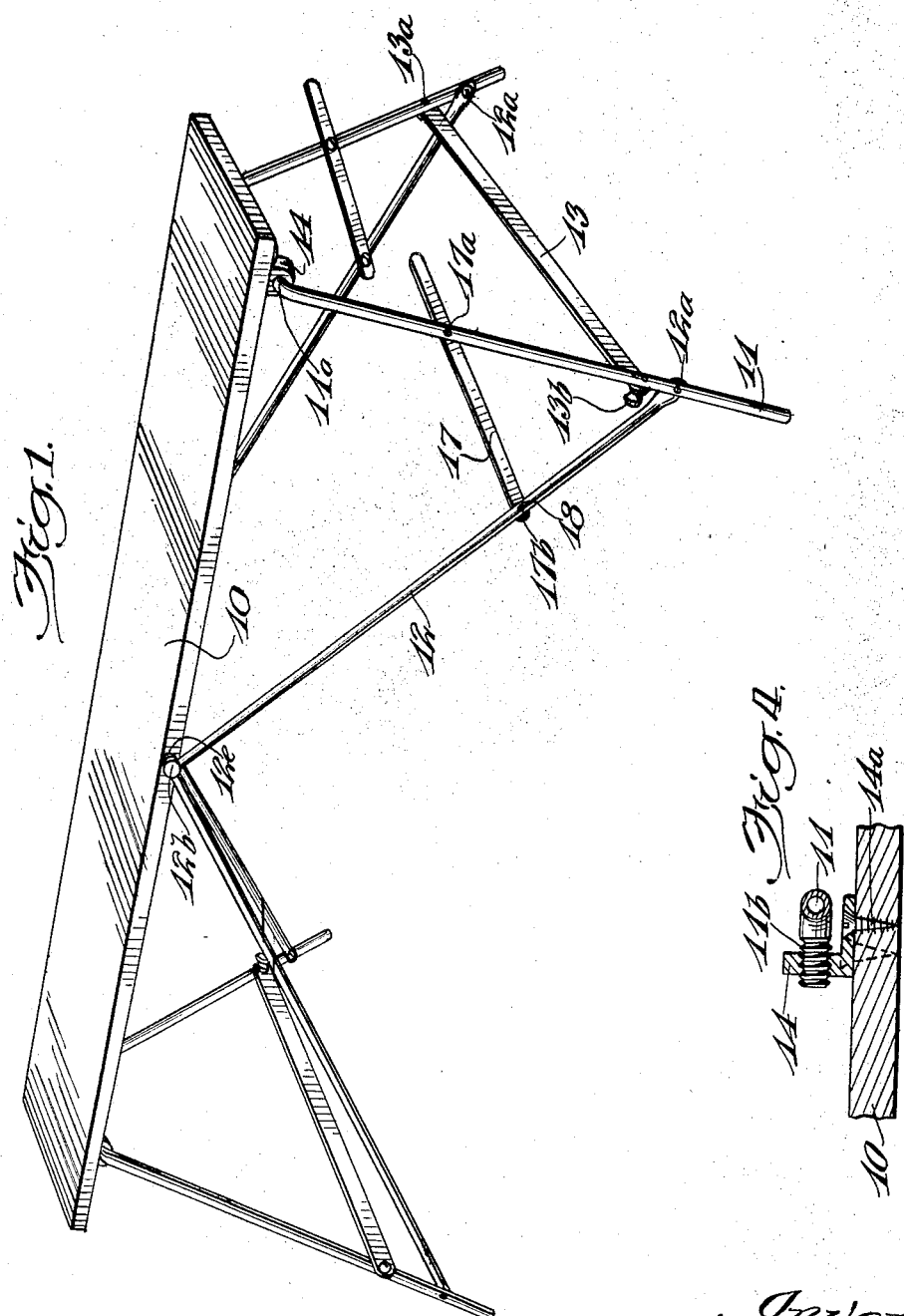

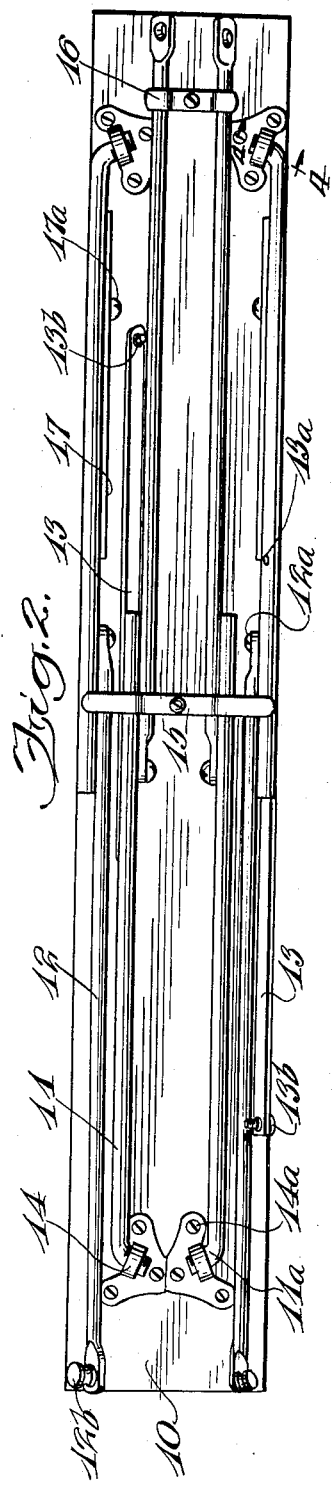
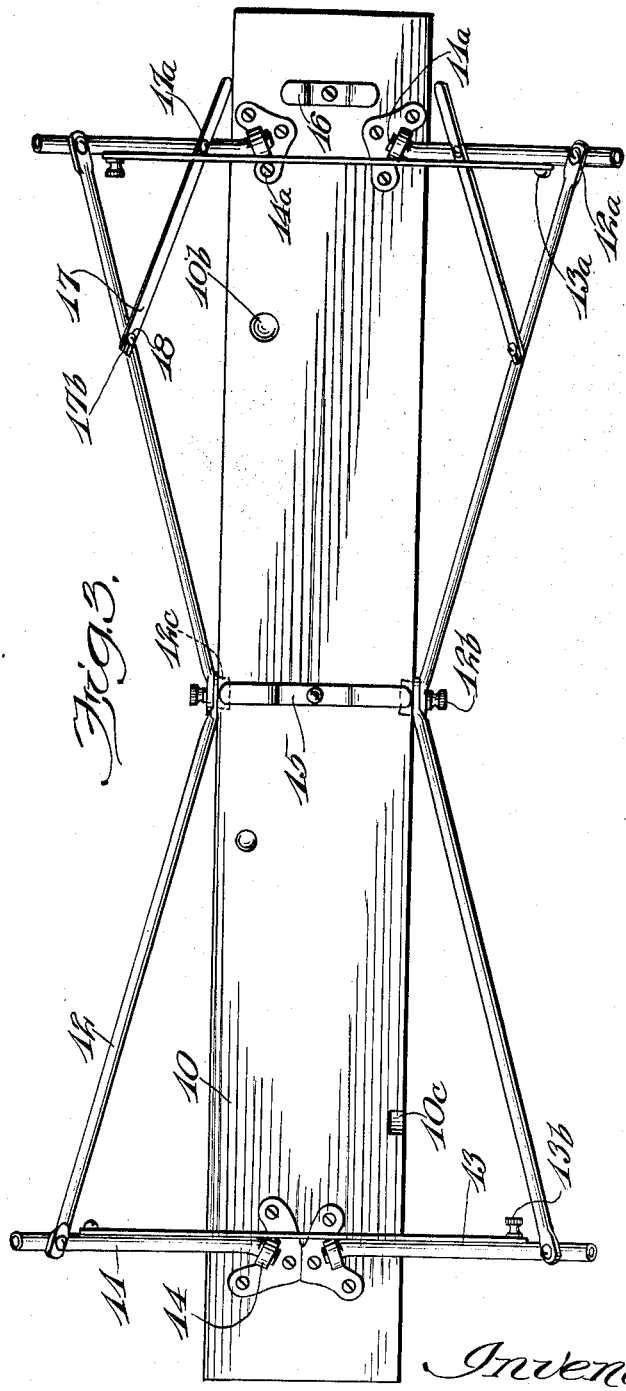

1,960,181

UNITED STATES PATENT OFFICE 1,960,181

WORK BENCH

Raymond C. Dreier, Chicago, Ill.

Application February 4, 1932, Serial No. 590,888
Renewed October 19, 1933

4 Claims. (Cl. 45—11)

My invention relates to work benches, and more particularly to those intended for pipe threading equipment, and my main object is to provide a bench of this kind which has a high factor of stability.

A further object of the invention is to so design the novel bench that it is foldable to a very compact size for easy handling and economical storage.

Another object of the invention is to construct the novel bench with few parts which are simple and sturdy, making for an article of low cost and durable qualities.

With the above objects in view and any others that may suggest themselves from the specification and claims to follow, a better understanding of the invention may be had by reference to the accompanying drawings in which—

Fig. 1 is a perspective view of the novel bench as set up in position for use;

Fig. 2 is a bottom view of the bench as folded;

Fig. 3 is a bottom view of the same in the unfolded position; and

Fig. 4 is a sectional detail taken on the line 4—4 of Fig. 2.

In the pipe threading art, it is customary to set up the pipe vise and accessory implements on the end of a long bench, which is usually a stationary one. As jobs change from one location to another, it is highly desirable that a portable bench of this kind be had. Accordingly, I have designed a bench which is both dimensioned particularly for pipe threading work, and has a spread when unfolded which procures ample stability.

By specific reference to the drawings, 10 denotes the top of the bench, the same being a board or plank about a foot wide and some eight or ten feet long. It is understood that the pipe threading work requires only enough width for the vise, but the extreme length is required to support the length of pipe which extends from the vise.

The top 10 receives legs 11 on the underside, these occurring near the ends of the top; and each leg is braced by a diagonal length 12 directed to the middle of the top edges. The legs and braces are of pipe to reduce their weight. Also, each pair of legs is braced crosswise by a metal strap 13. Each brace 12 is secured by a pivot screw 12a from the corresponding leg, and the upper end of the brace is perforated for the passage of a thumb screw 12b whose shank threads into a medial nut 12c embedded in the edge of the bench top 10. The shank of the thumb screw is long enough to receive the ends of adjoining braces side-by-side, whereby to fasten two braces at the same time. Each cross strap is also extended from a pivot screw 13a in one of the legs and is perforated at its other end to receive a thumb screw 13b which threads into the companion leg which may be internally reinforced for this purpose. The thumb screws 12b and 13b are retentively secured to the parts which carry them, in order that they may not be lost.

The upper ends of the legs 11 are made with inward bends 11a which are journaled in bearings 14 secured by screws 14a to the underside of the bench top. The bearings 14 are set on a bias, as clearly shown in Fig. 3, and the angle of the bends 11a is so related to the legs and the course of the bearings that the legs will occupy a spread position as shown in Fig. 1 when the bench is set up, yet close to a narrow parallel spacing when folded under the bench top, as shown in Fig. 2. The principle of this action is in the consideration that each leg is positioned to describe a conical plane when swung about its bend 11a as an axis. Thus, the bearing is so set as to locate two radial lines in the above plane to correspond with the spread and folded lines of the leg, and the folding and unfolding actions of the leg are, of course, partial courses in the plane.

It will be seen that the simple connection described for the bench legs disposes them firmly in either of the positions mentioned. While the legs may be retained to the bearings by any known expedient, I have indicated in Fig. 4 that the bends 11a are threaded 11b to screw into the bearings, this form of connection being positive and requiring no extra parts.

It will be seen that the leg bearings at one end of the bench are closely grouped; while those at the other are spread. This arrangement enables the legs pertaining to the first set of bearings to fold within the space between the legs pertaining to the second set of bearings, so that one pair of legs does not interfere with the other and the legs are not limited as to length. When the legs fold, the braces 12 and straps 13 open out in extended fashion and lie alongside each other next to the bench top. The latter is recessed in places as indicated at 10b and 10c to receive the thumb screw heads and permit the parts carrying them to lie flatly against the top. In order to retain the folded assembly to the bench top, I have shown swivel clamps 15 and 16 secured to the top and holding the parts in place; of course, any other suitable expedient may be employed to attain this end. For convenience to the attendant, I have provided supporting arms 17 for die-stocks and odd lengths of pipe at one end of the bench, as clearly shown in Fig. 1. These arms are pivoted by screws 17a to the respective legs and are slotted in their inner ends as indicated at 17b to receive screws 18 carried by the corresponding braces 12. It will be seen from Fig. 1 that the braces and the arms form an obtuse angle suitable for resting die-stocks and shorter lengths of pipe; and the arms also form an angle with the legs 11 to support more handily different sized die-stocks that may be required in short order on any job. In this connection, it is seen that the braces also form an acute angle with the legs, to provide pockets for the deposit of bars or pieces of heavy pipe to ballast the bench when heavier work is done.

When the bench is folded, the down swing of the braces 12 releases the arms 17, and the latter may then be swung alongside the legs and cause them to assume a close position thereto when the legs are folded.

It will be seen that the bench described above forms a useful accessory for the pipe threading work. The manner of connecting the legs with the bench permits the legs to assume a spread of at least three times the width of the bench top, assuring a maximum amount of stability. The legs and other vital supports being made of pipe are both economical to produce as well as of sufficient weight to make the bench stable when in use; yet, the bench is sufficiently light to be carried from place to place when folded up. Finally, it will be evident that the parts entering into the construction of the novel bench are simple, rugged and without precise or accurate adjustment, so that the bench will serve efficiently for long periods without suffering from rough handling or impact by pipes and tools involved in its use. I have not illustrated the pipe threading equipment in connection with the novel bench for the reason that, while this function is the preferred one, a bench of this type may have various other uses and forms without departing from the principle of its construction.

I claim:—

1. A bench comprising a top, pivot bearings carried by the under side thereof, said bearings extending at an angle from the sides of the bench, and legs depending from the bench top and with their upper end portions journaled in the bearings, said end portions being at an angle to the legs.

2. The structure of claim 1, the angle of the end portions with the legs being obtuse.

3. The structure of claim 1, said legs being in pairs at the end portions of the bench and normally spread, and each leg being swingable about its bearing and with its angle points a vertex through a conical path into a position longitudinally of the top and substantially alined with such bearing.

4. The structure of claim 1, said legs being in pairs at the end portions of the bench and normally spread, and each leg being swingable about its bearing with its angle point as a vertex through a conical path starting with a radial line defined by its spread position and terminating with a radial line next under the top.

RAYMOND C. DREIER.